United States Patent
Adams et al.

(10) Patent No.: US 10,216,375 B2
(45) Date of Patent: *Feb. 26, 2019

(54) CLOSING A CHILD APPLICATION WINDOW OF A PARENT WINDOW

(71) Applicant: International Business Machines Corporation, Armonk, NY (US)

(72) Inventors: Michael C. Adams, Hampshire (GB); Jonathan R. Phillips, Hants (GB); Christopher J. M. Whyley, Hampshire (GB)

(73) Assignee: International Business Machines Corporation, Armonk, NY (US)

(*) Notice: Subject to any disclaimer, the term of this patent is extended or adjusted under 35 U.S.C. 154(b) by 481 days.

This patent is subject to a terminal disclaimer.

(21) Appl. No.: 14/940,836

(22) Filed: Nov. 13, 2015

(65) Prior Publication Data

US 2016/0077697 A1  Mar. 17, 2016

Related U.S. Application Data

(60) Continuation of application No. 11/782,899, filed on Jul. 25, 2007, now Pat. No. 9,223,588, which is a (Continued)

(30) Foreign Application Priority Data

Feb. 15, 2002 (GB) .................................. 0203617.6

(51) Int. Cl.
G06F 17/22 (2006.01)
G06F 3/0481 (2013.01)
(Continued)

(52) U.S. Cl.
CPC ............ *G06F 3/0484* (2013.01); *G06F 9/451* (2018.02); *G06F 17/2235* (2013.01)

(58) Field of Classification Search
CPC ...... G06F 9/4443; G06F 3/1438; G06F 9/451; G06F 9/543; G06F 3/0484; G06F 3/0481; (Continued)

(56) References Cited

U.S. PATENT DOCUMENTS 5,819,042 A   10/1998  Hansen
5,881,236 A    3/1999  Dickey
(Continued)

FOREIGN PATENT DOCUMENTS

EP          0660219         9/1994

OTHER PUBLICATIONS

Brent Lee, Advanced JavaScript windowing—part one: Self-closing popups, Jul. 1998, 6 pages.*
(Continued)

*Primary Examiner* — Thuy Dao
(74) *Attorney, Agent, or Firm* — Schmeiser, Olsen & Watts, LLP; Brian Restauro

(57) ABSTRACT

A method, and associated system, for closing a child application window of a parent window. An indicator in data loaded into the parent window is instantiated. After the indicator is instantiated, it is determined that the data currently loaded into the parent window does not include the indicator and in response, a first number of seconds is paused followed by ascertaining that the data currently loaded into the parent window does not comprise the indicator and in response, the child application window is closed.

17 Claims, 4 Drawing Sheets

Related U.S. Application Data division of application No. 10/504,678, filed as application No. PCT/GB03/00549 on Feb. 6, 2003, now Pat. No. 7,299,474.

(51) Int. Cl.
*G06F 3/00* (2006.01)
*G06F 3/0484* (2013.01)
*G06F 9/451* (2018.01)

(58) Field of Classification Search
CPC ......... G06F 17/2235; G06F 8/38; G09G 5/14; H04L 67/02; H04L 67/08; G06Q 30/02
See application file for complete search history.

(56) References Cited

U.S. PATENT DOCUMENTS

| | | | |
|---|---|---|---|
| 6,118,451 A | 9/2000 | Alexander | |
| 6,192,361 B1 | 2/2001 | Huang | |
| 6,240,444 B1 | 5/2001 | Fin et al. | |
| 6,546,397 B1* | 4/2003 | Rempell | G06F 8/20 |
| 6,630,946 B2* | 10/2003 | Elliott | G06F 17/24 |
| | | | 715/781 |
| 6,675,371 B1* | 1/2004 | York | G06F 9/451 |
| | | | 717/114 |
| 6,871,348 B1* | 3/2005 | Cooper | G06F 9/451 |
| | | | 719/310 |
| 7,100,203 B1 | 8/2006 | Tosey | |
| 7,117,079 B2 | 10/2006 | Streichsbler et al. | |
| 7,299,474 B2* | 11/2007 | Adams | G06F 3/0484 |
| | | | 719/310 |
| 7,325,204 B2* | 1/2008 | Rogers | G06F 3/0481 |
| | | | 715/792 |
| 7,478,245 B2 | 1/2009 | Allen | |
| 7,562,297 B2* | 7/2009 | Carroll | G06F 9/451 |
| | | | 715/705 |
| 7,606,901 B2 | 10/2009 | Heymann et al. | |
| 2001/0051998 A1* | 12/2001 | Henderson | G06Q 30/02 |
| | | | 709/217 |
| 2003/0016253 A1* | 1/2003 | Aoki | G06F 1/1626 |
| | | | 715/863 |
| 2004/0128557 A1 | 7/2004 | Sakushima et al. | |
| 2005/0050301 A1* | 3/2005 | Whittle | G06F 9/451 |
| | | | 712/32 |
| 2005/0172297 A1 | 8/2005 | Garcia | |
| 2007/0214495 A1 | 9/2007 | Royer et al. | |
| 2009/0319786 A1 | 12/2009 | Huang | |

OTHER PUBLICATIONS

"Pending Apply/Close Program", IBM Technical Disclosure Bulletin, Oct. 1991, vol. 34, No. 5, p. 384.
Notice of Allowance (dated Aug. 7, 2015) for U.S. Appl. No. 11/782,899, filed Jul. 25, 2007, Conf. No. 8365.
Reply Brief (Mar. 30, 2012) for U.S. Appl. No. 11/782,899, filed Jul. 25, 2007, Conf. No. 8365.
Examiner's Answer (Jan. 31, 2012) for U.S. Appl. No. 11/782,899, filed Jul. 25, 2007, Conf. No. 8365.
Appeal Brief (Nov. 21, 2011) for U.S. Appl. No. 11/782,899, filed Jul. 25, 2007, Conf. No. 8365.
Notice of Appeal (Sep. 19, 2011) for U.S. Appl. No. 11/782,899, filed Jul. 25, 2007, Conf. No. 8365.
Advisory Action (dated Sep. 12, 2011) for U.S. Appl. No. 11/782,899, filed Jul. 25, 2007, Conf. No. 8365.
Final Amendment (dated Aug. 17, 2011) for U.S. Appl. No. 11/782,899, filed Jul. 25, 2007, Conf. No. 8365.
Final Office Action (dated Jun. 17, 2011) for U.S. Appl. No. 11/782,899, filed Jul. 25, 2007, Conf. No. 8365.
Amendment (dated Apr. 5, 2011) for U.S. Appl. No. 11/792,899, filed Jul. 25, 2007, Conf. No. 8365.
Office Action (dated Jan. 13, 2011) for U.S. Appl. No. 11/782,899, filed Jul. 25, 2007, Conf. No. 8365.
Notice of Allowance (dated Jul. 17, 2007) for U.S. Appl. No. 10/504,678, filed Aug. 12, 2004, Conf. No. 5134.
Office Action (dated Jan. 29, 2007) for U.S. Appl. No. 10/504,678, filed Aug. 12, 2004, Conf. No. 5134.
Amendment (dated Apr. 19, 2007) for U.S. Appl. No. 10/504,678, filed Aug. 12, 2004, Conf. No. 5134.

* cited by examiner

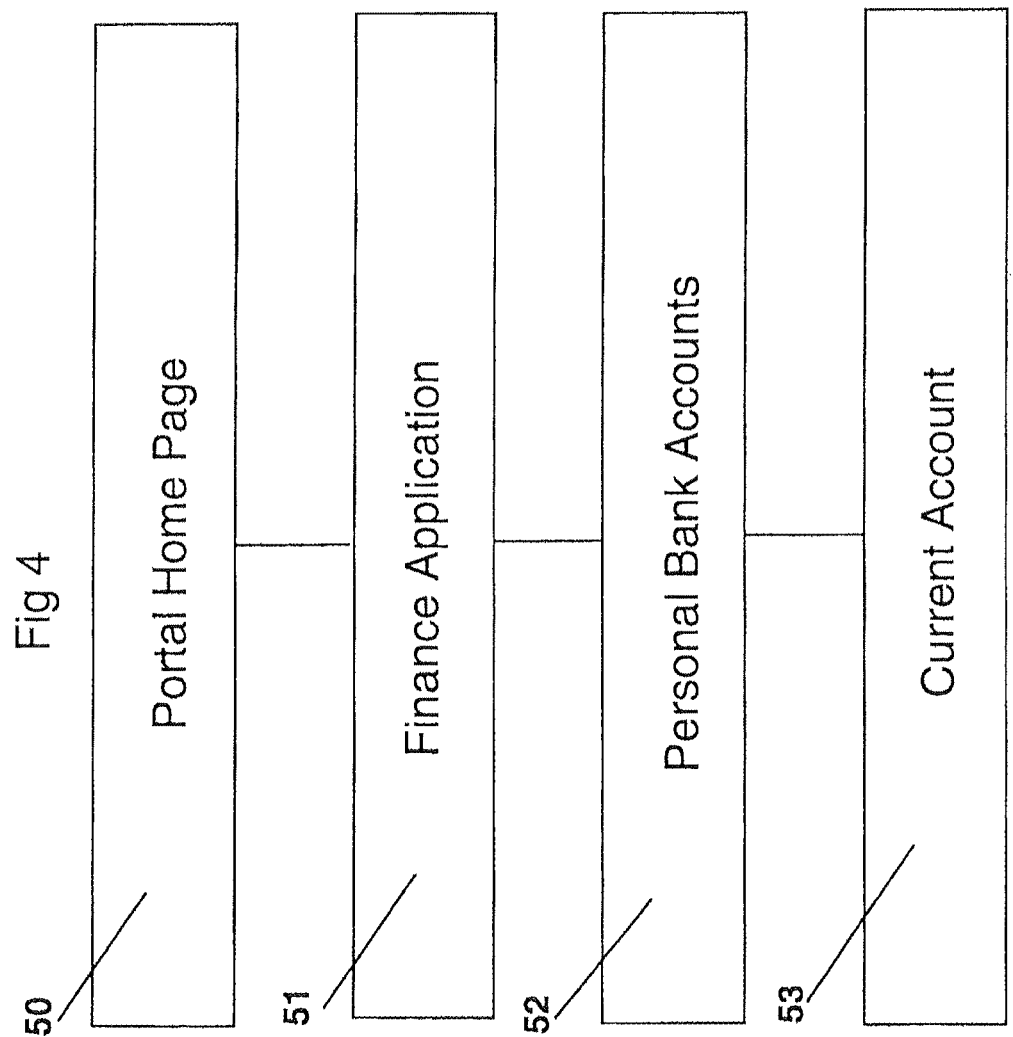

CLOSING A CHILD APPLICATION WINDOW OF A PARENT WINDOW

This application is a continuation application claiming priority to Ser. No. 11/782,899 filed Jul. 25, 2007, now U.S. Pat. No. 9,223,588, issued Dec. 29, 2015, which is a divisional of Ser. No. 10/504,678, filed Aug. 12, 2004, U.S. Pat. No. 7,299,474, issued Nov. 20, 2007.

FIELD OF THE INVENTION

The present invention relates to the field of Internet technologies and the protection of user's privacy when using an application that enables a user to browse confidential or sensitive information. More specifically the present invention relates to a method for effecting the closure of an application window in response to an event associated with its parent window.

BACKGROUND OF THE INVENTION

Consumers use the services provided by the World Wide Web to perform confidential transactions such as personal banking, share dealing, buying goods on-line or launching other services from within a portal environment.

A user can access these services over a network communicating with servers located throughout the world for obtaining information. The information is stored on servers and delivered to the user's application from a server by sending files or data packets to the requesting client application from the network server resources.

When performing such transactions on line consumers are concerned about the privacy and security of their information. In particular the use of shared computers by a number of different users at the same location increases these concerns as confidential information is on display in open application windows for other users to view.

When a number of users share the same computer it is possible that a user may not log off or shut down their application correctly and leave sensitive, confidential or personal information on display in open application windows for a subsequent user to view. The information contained in the open application windows could be used by another user to gain unauthorized access to another persons' bank accounts, share-dealing accounts or credit card details. This is a particular problem for network applications accessing confidential information on-line. The security concerns can mostly be mitigated by explicit session management.

Hypertext Transfer Protocol - HTTP, which defines the ways in which network applications interact with network servers; performs session management. HTTP is a 'request-reply' protocol in which the client sends a request message to the server containing the URL of the required resource. The server looks up the pathname and, if it exists, sends back the file's content in a reply to the client. HTTP allows for content negotiation and authentication.

Authentication involves a user entering a password; on first attempt to access a password protected area, the server reply contains a challenge applicable to that resource, for example a digital signature. When it receives the challenge, the client prompts the user to type a name and password and submits associated credentials with subsequent requests.

However the need to establish and close a connection for every request-reply exchange is expensive, both in overloading the server and in sending too many messages over the network. Persistent connections are used that remain open over a series of request reply exchanges between client and server. A persistent connection can be closed by a client or server at any time by sending an indication to the other participant. Servers may be configured to close a persistent connection when it has been idle for a period of time. If an application over a network has been idle for some time then the connection will time out and the user will be required to re-enter their authentication details into the application.

Session management can therefore be useful to stop an unauthorized user gaining access to a variety of different applications that a user may be logged on to, but session management does not provide management of windows and consequently an unauthorized user will be able to view any confidential information on display in an open application window.

Where an explicit log off has not occurred in the application window there are a number of design implications that can be considered when designing the user interface with regards to the management of windows. Broadly these fall into the following categories which are; not launching any further application windows, only launching a single application window at a given time in an application window that exhibits modal behavior, or closing the application's home page window by using the application's File—Exit route or an operating system provided function such as the 'X' icon or task manager.

One method of providing the management of windows in an application is to use an interpreted client side programming language to provide the required functionality. Using an interpreted client side programming language such as JavaScript, the management of windows is limited to creating new application windows with defined properties of height, width, color and style. A client side programming language such as JavaScript uses what are known as 'modal windows' to obtain user feedback as to whether to perform specified operations. A typical modal window contains one or more buttons yes, no, cancel or okay and a question prompting the user, for example 'Do you wish to close this application?'. A modal window will not go away until a user clicks on the yes, no, cancel or okay button.

Modal application windows that are provided by client side code have their limitations, for example when using the showModalDialog( ) function in JavaScript. The showModalDialog( ) function creates a separate pop up application window displaying the html page of a given URL. The application window allows the user to address the data of that application window before returning to the parent application window.

The showModalDialog( ) function is Internet Explorer® browser specific and provides no support for the Netscape® browser or the W3C Document Object Model. The showModalDialog( ) function creates a completely standalone application window which has no scriptable relationship with the launching application window. On the Macintosh® operating system platform it is not possible to set the width, height and color properties.

The onFocus( ) function in the parent window enables the selection of the parent application window and captures the event generated by the onFocus( ) function. The onFocus( ) function carries out a check to determine whether the launched application window exists. The onFocus event handler executes the specified JavaScript code or function on the occurrence of an onFocus( ) generated event. The onFocus event occurs when a window, frame or form element is given focus by the user. The onFocus( ) function works in the Internet Explorer® browser and the Netscape 4.xx® browser, the Macintosh® and the LINUX® platforms.

A disadvantage of this function is the inability to minimize the modal window in the Microsoft Windows® operating system. The function can be fatal in the Netscape 6® browser. When the close button on the parent application window is selected and the modal application window is open the parent window is closed leaving the modal application window open.

The repeated calling of the self.focus( ) function in a child application window, allows a timer to start when a document is loaded into the application window. The timer rapidly and repeatedly calls the self.focus( ) function on the launched window. A disadvantage of implementing the self.focus( ) function is that it is modal to all other applications and the function cannot access other launched application windows, because there does not exist a scriptable relationship between the application window and the modal window. The self.focus( ) function can also close the launched application window via the operating system function calls; thereby leaving the launched window open, which potentially could contain a transactional application in an invalid session.

The onFocus( ) or onClick( ) function in the parent window calls the onOpenedWindow( ) function. Focusing or clicking on the parent application window calls a check for the existence of a launched application window. If the check returns true then the launched application window is brought forward by windowname.focus( ) function. The windowname.focus( ) function has the disadvantage that it does not produce consistent results in the Internet Explorer 4® browser.

Compatibility problems are a major consideration when creating applications using an interpreted client side language. Different applications support different levels of HTML and the amount of JavaScript functionality that an application can support depends on the interpreter in the application.

Another method of closing opened application windows is by a system provided function such as the 'X' icon on the application task bar, the task manager or by the use of the File/Exit on the menu bar. Although this closes the opened application window it provides no automation of the close action of any network or non-network application window launched from within the initial application window and relies on the user to perform the action.

DISCLOSURE OF THE INVENTION

In accordance with the present invention there is now provided a method for effecting the closure of an application window in response to an event associated with its parent application window comprising the step of, polling on an indicator associated with the parent of the application window and in the absence of said indicator accessing a system provided function causing the closure of the application window. The present invention provides for the automatic closure of a child application window in response to an event associated with the parent of the application window. The present invention closes the child application window when the parent application window no longer exists. Each launched application window takes on the role of a parent and a child with the control of the application window associated with the individual launched application windows. By associating window control with the individual launched applications windows, the launched application is able to detect whether the application it was launched from exists or not.

Preferably the method provides for the polling of an indicator of the parent of the application window for the existence of the indicator to determine whether the application window is not to be closed. The present invention provides for the data within the application window to be refreshed or reloaded without closing the application window or subsequent launched application windows that are still required by the user.

Preferably the method provides for an event, which is navigating to a resource outside of the application's environment. If a resource is navigated to outside of the application's environment, the application window will close.

Preferably the method provides for monitoring the status of the indicator of the parent of the application window. Preferably the method provides for an application window to operate in a network environment.

According to a second aspect of the present invention, a computer program product comprising computer program code stored on a computer readable storage medium, when executed on a computer, the program code embodied therein effects the closure of an application window in response to an event occurring in the parent of the application window.

According to a third aspect of the present invention, there is provided a system for effecting the closure of an application windows in response to an event associated with its parent application window, the system comprising means for polling on an indicator associated with the parent of the application window and in the absence of said indicator accessing a system provided function thereby causing the closure of the application window.

Preferably the system provides means for polling on said indicator of the parent of the application window for the existence of said indicator to determine whether the application window is not to be closed. Preferably the system provides means for detecting the occurrence of an event, wherein the event is navigating to a resource outside of the application's environment.

Preferably the system provides a means for, monitoring the status of the indicator of the parent of the application window. Preferably the system provides means for the parent of the application window to be refreshed without destroying data within the application window.

Preferably the system provides means for the parent of the application window to be closed, without closing a required application window.

The present invention when operating in a network environment allows for the inherent problems of network page delivery latency. When an application window is reloading or refreshing data within its window, the invention comprises a means for polling on the existence of an indicator to determine the indicators existence. If it does not exist, the system pauses for m seconds before checking for the existence of the indicator. This will allow for the data to be refreshed within the application window without closing any dependent application windows. This achieves a further advantage of not destroying the data structure of the application's window that is being refreshed. Unlike a traditional desktop system the flags exist throughout the user's session and the data is not lost. The present invention therefore does not need to keep a list of what application windows are open and what event handlers are in use at any given time.

The present invention further provides an advantage in that the described method, computer program product and system operates across a variety of different applications and is not application specific.

BRIEF DESCRIPTION OF THE DRAWINGS

The invention will now be described by way of example only, with reference to the accompanying drawings, in which:

FIG. 4 illustrates the relationship between multiple application windows as described by the present invention.

DETAILED DESCRIPTION OF THE INVENTION

Figure 1:
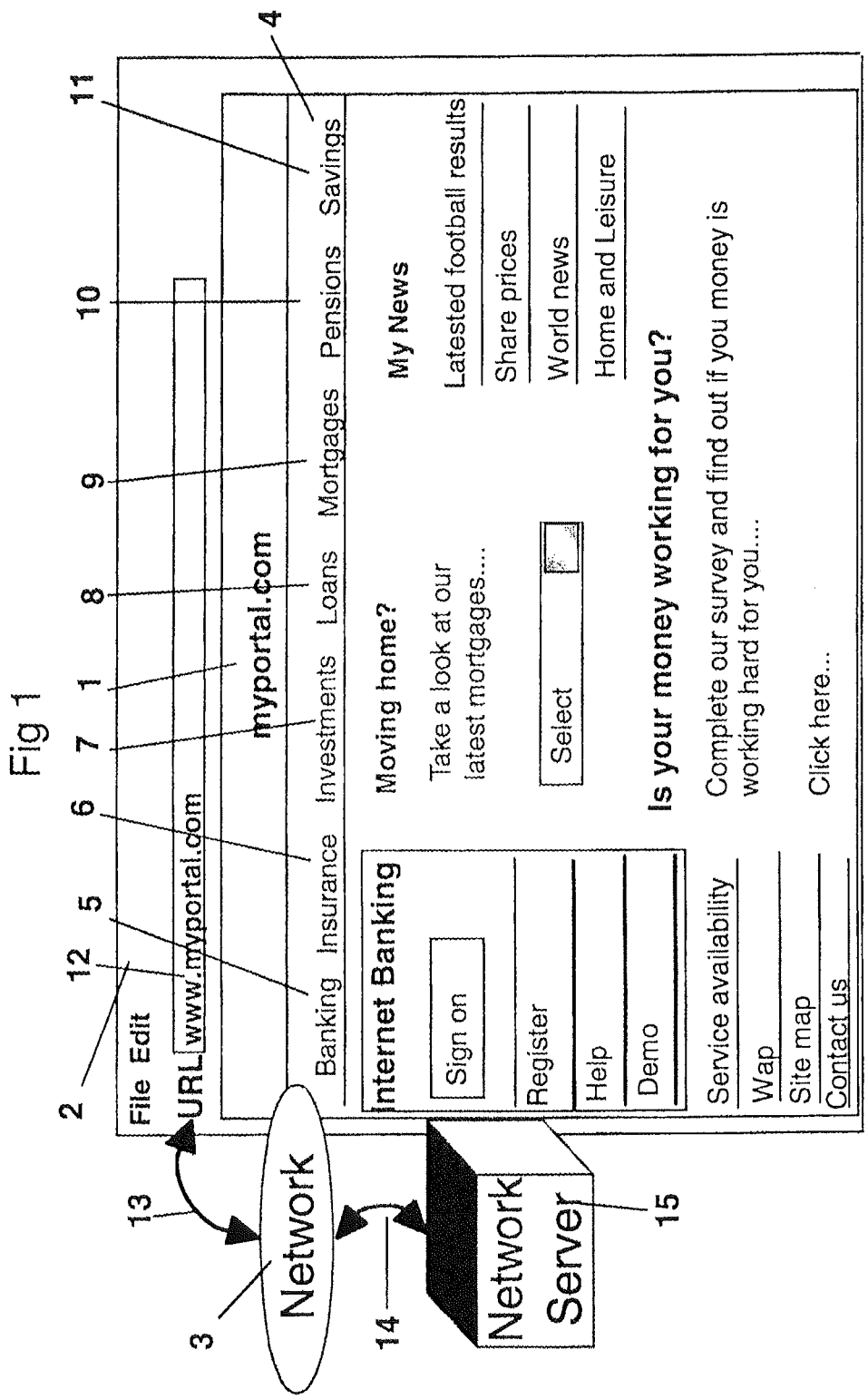
FIG. 1 illustrates a portal environment as accessed in a network or non-network environment as found in the prior art.

Referring to FIG. 1, a portal environment 1, accessed by a network application 2 over a network 3, contains a plurality of hypertext links to other services 4 for example banking 5, insurance 6, investment 7, loans 8, pensions 10 and savings 11.

Clicking on the service's hypertext link can access a service 4. The application sends a request message 13 through the network 3 to the network server 15 containing the URL 12 of the required resource. The network server 15 looks up the pathname of the requested resource 12 and the network server 15 sends back the file contents in a reply message 14 through the network 3 to the application 2. The requested resource 12 is loaded into an application window in the portal environment 1.

A plurality of services can be accessed and loaded into a plurality of launched application windows whilst retaining access to the portal home page in the initial application window.

Figure 2:
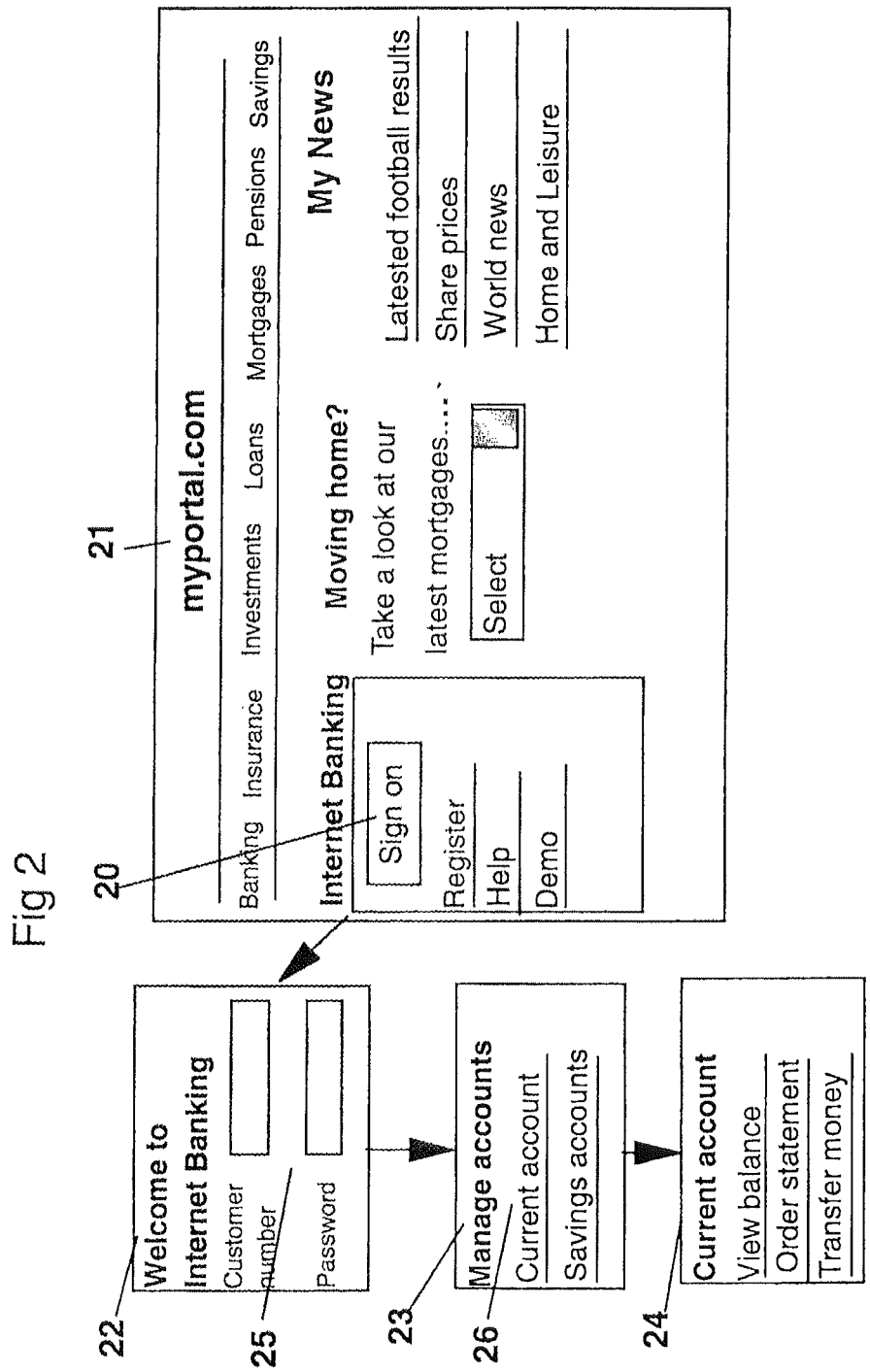
FIG. 2 illustrates multiple applications in a portal environment as found in the prior art.

Referring to FIG. 2, Internet banking is accessed by selecting the 'sign on' hypertext link 20 from the Internet banking section of the portal home page 21. A new application window 22 is launched and displayed together with the portal homepage 21. Confidential information is required to be input into the application's form fields 25 to identify the user to the application. Once a log-on has successfully completed a second application window 23 is launched, displaying a list of options pertaining to the manage accounts window, as a selection of hypertext links 26. To manage a current account, the current account 26 hypertext link is selected and a third application window 24 is launched. Further options are displayed in the newly launched application window. In the example of FIG. 2, by way of an example only, a total of four nested application windows are open on the computer screen. Each application window is dependent on the application window that it was launched from.

The present invention is equally applicable to both network environments and non-network environments, where the required information is contained on a server located on a network or stored on a user's computer disk storage system and accessed off-line.

Figure 3:
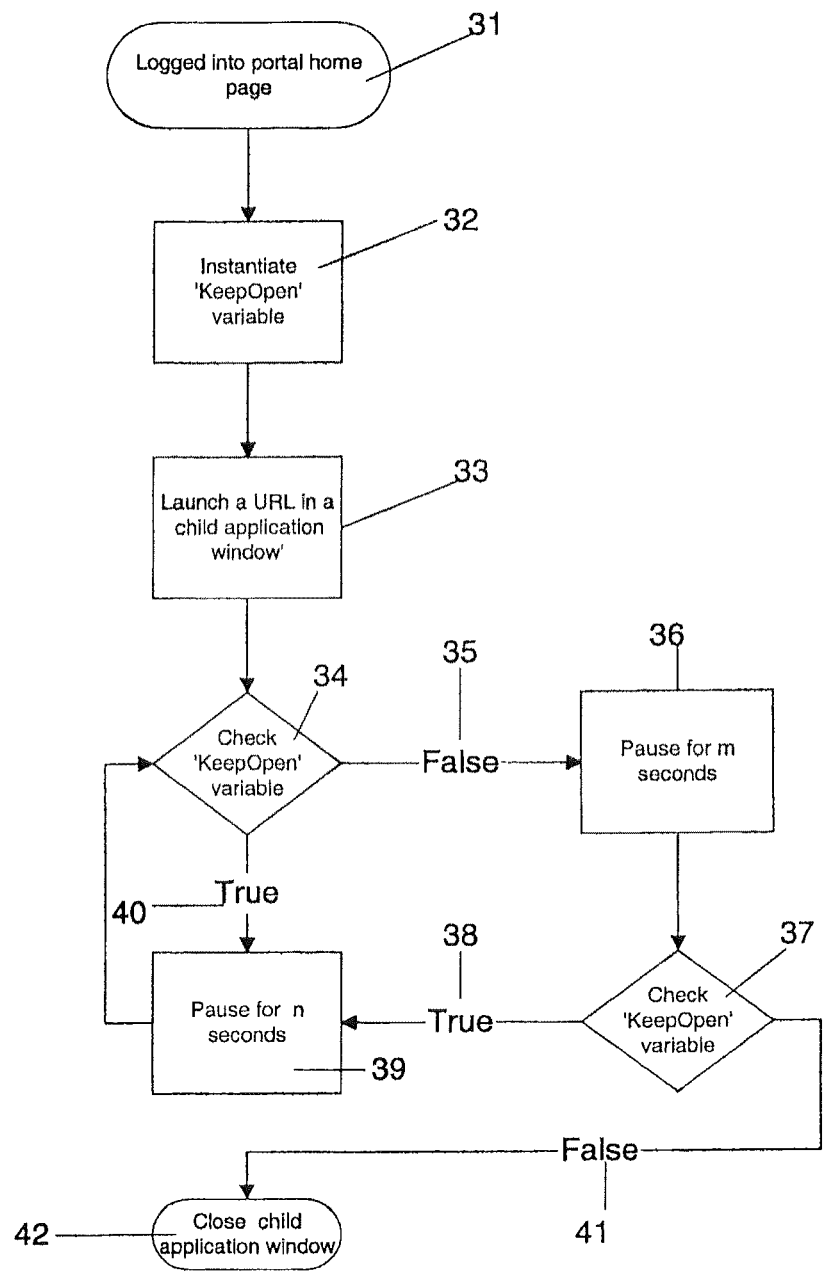
FIG. 3 shows a flow diagram illustrating the application window closing method of the present invention.

Referring now to FIG. 3, the portal home page application is launched 31, displaying the hypertext links to other services within or outside of the portal environment. A variable called 'KeepOpen' is instantiated in the launched portal homepage window 32. A dependent application window is launched 33 by selecting a hypertext link from the portal homepage 1.

The <body> tag in the html page in a launched application window contains an onLoad( ) function. The onLoad( ) function calls an initial function. The initial function carries out a check to ascertain if the data currently loaded into the application's parent window contains a variable named for example 'KeepOpen' 34.

If the initial function returns a value of 'false' 35, the initial function ceases checking whether the variable exists for m seconds 36. This allows for the parent application to be refreshed by a user or another application.

After m seconds the initial function resumes its check on the 'KeepOpen' variable 37. If the initial function finds that the 'KeepOpen' variable exists, the initial function returns a value of true 38. The initial function stops checking the existence of the variable for n seconds 39. After n seconds the initial function resumes its check on the 'KeepOpen' variable.

The initial function continues through this process until the initial function returns a value of 'false' 35. The initial function pauses checking on the 'KeepOpen' variable for m seconds 36 to allow for the parent application being refreshed. After m seconds the initial function resumes its check on the 'KeepOpen' variable. If the 'KeepOpen' variable does not exist then a value of 'false' is returned 41 and the child window is closed 42.

The present invention allows for the inherent problems of network page delivery latency when an application is reloading or refreshing data within its window. The present invention provides a method for polling on the existence of an indicator to determine the indicators existence. If it does not exist, the method pauses for m seconds before checking the existence of the variable. This process allows for the data within the application window to be refreshed without closing any dependent application windows. This achieves a further advantage of not destroying the data structure of the application's window that is being refreshed, unlike a traditional desktop system the flags exist throughout the users session. The present invention therefore does not need to keep a list of what application windows are open and what event handlers are in use at any given time.

Referring now to FIG. 4 of the present invention, a plurality of application windows can be launched from within a portal environment. Each application window is dependent on the application that it was launched from.

When closing the finance application window 51 by navigating to a resource outside of the portal environment or clicking on a close button, the personal bank account application window 52 and the current account application window 53 will be closed. The current account application window 53 is dependent on the personal bank account application window 52. The personal bank account application window 52 is dependent on the finance application window 51. Each window is dependent on the window that it was launched from as the logic runs in the dependent window. Each launched application window takes on the role of a parent and child, but only if a further application window is launched from within the parent application window therefore creating a child application window.

When closing the current account application window 43, only the current account application window 53 will close, as there does not exist in this example a dependent window.

When closing the portal home page window 50, the finance application window 51, the personal bank accounts application window 52 and the current account application window 53 will close.

What is claimed is:

1. A method for closing a child application window of a parent window, said method comprising:
   instantiating an indicator in data loaded into the parent window;
   after said instantiating the indicator, determining that the data currently loaded into the parent window does not comprises the indicator and in response, pausing a first number of seconds followed by ascertaining that the data currently loaded into the parent window does not comprise the indicator and in response, closing the child application window; and after said instantiating the indicator and before said determining that the data currently loaded into the parent window does not comprise the indicator, making a determination that the data currently loaded into the parent window does not comprise the indicator and in response, pausing the first number of seconds followed by ascertaining that the data currently loaded into the parent window comprises the indicator and in response, pausing a second number of seconds.

2. The method of claim 1, said method comprising:
during said pausing the second number of seconds, refreshing the parent window.

3. The method of claim 1, wherein the first number of seconds and the second number of seconds differ from each other.

4. The method of claim 1, wherein said ascertaining that the data currently loaded into the parent window does not comprise the indicator is triggered by a closing of the parent window.

5. The method of claim 4, wherein the closing of the parent window resulted from an event associated with the parent window.

6. The method of claim 5, wherein the parent window is associated with a portal home page of a parent application, and wherein the event comprises navigation to a resource outside of an environment of the parent application.

7. The method of claim 1, wherein the parent window is associated with a portal home page of a parent application, and wherein said method comprises:
launching the child application by selecting a text link from the portal homepage.

8. A system comprising a computer and a computer readable storage medium, said storage medium containing computer program code that when executed on the computer performs a method for closing a child application window of a parent window, said method comprising:
instantiating an indicator in data loaded into the parent window;
after said instantiating the indicator, determining that the data currently loaded into the parent window does not comprises the indicator and in response, pausing a first number of seconds followed by ascertaining that the data currently loaded into the parent window does not comprise the indicator and in response, closing the child application window; and
after said instantiating the indicator and before said determining that the data currently loaded into the parent window does not comprise the indicator, making a determination that the data currently loaded into the parent window does not comprise the indicator and in response, pausing the first number of seconds followed by ascertaining that the data currently loaded into the parent window comprises the indicator and in response, pausing a second number of seconds.

9. The system of claim 8, said method comprising:
during said pausing the second number of seconds, refreshing the parent window.

10. The system of claim 8, wherein the first number of seconds and the second number of seconds differ from each other.

11. The system of claim 8, wherein said ascertaining that the data currently loaded into the parent window does not comprise the indicator is triggered by a closing of the parent window.

12. The system of claim 11, wherein the closing of the parent window resulted from an event associated with the parent window.

13. A computer program product comprising a computer program code stored on a non-transitory computer readable storage medium, said program code, upon being executed on a computer, performs a method for closing a child application window of a parent window, said method comprising:
instantiating an indicator in data loaded into the parent window;
after said instantiating the indicator, determining that the data currently loaded into the parent window does not comprises the indicator and in response, pausing a first number of seconds followed by ascertaining that the data currently loaded into the parent window does not comprise the indicator and in response, closing the child application window; and
after said instantiating the indicator and before said determining that the data currently loaded into the parent window does not comprise the indicator, making a determination that the data currently loaded into the parent window does not comprise the indicator and in response, pausing the first number of seconds followed by ascertaining that the data currently loaded into the parent window comprises the indicator and in response, pausing a second number of seconds.

14. The computer program product of claim 13, said method comprising:
during said pausing the second number of seconds, refreshing the parent window.

15. The computer program product of claim 13, wherein the first number of seconds and the second number of seconds differ from each other.

16. The computer program product of claim 13, wherein said ascertaining that the data currently loaded into the parent window does not comprise the indicator is triggered by a closing of the parent window.

17. The computer program product of claim 16, wherein the closing of the parent window resulted from an event associated with the parent window.

* * * * *